United States Patent [19]

Elrick et al.

[11] 3,982,975

[45] Sept. 28, 1976

[54] PROPELLANTS HAVING IMPROVED RESISTANCE TO OXIDATIVE HARDENING

[75] Inventors: Donald E. Elrick, Rawlings; Harry Gilbert, Cumberland, both of Md.

[73] Assignee: Hercules Incorporated, Wilmington, Del.

[22] Filed: June 4, 1968

[21] Appl. No.: 736,929

Related U.S. Application Data

[63] Continuation-in-part of Ser. No. 667,623, Sept. 6, 1967.

[52] U.S. Cl.............................. 149/19.9; 149/19.6; 149/19.91; 149/20
[51] Int. Cl.²........................................ C06D 5/06
[58] Field of Search .......... 149/19, 20, 19.9, 19.91, 149/19.6

[56] References Cited
UNITED STATES PATENTS

| 3,087,843 | 4/1963 | Pritchard .............................. 149/19 |
| 3,087,844 | 4/1963 | Hudson et al.......................... 149/19 |
| 3,147,161 | 9/1964 | Abere et al............................ 149/19 |
| 3,155,552 | 11/1964 | Vriesen................................. 149/19 |
| 3,214,304 | 10/1964 | Vriesen................................. 149/19 |
| 3,305,523 | 2/1967 | Burnside............................ 149/19 X |
| 3,376,622 | 11/1969 | Harada et al. ........................ 149/19 |

*Primary Examiner*—Benjamin R. Padgett
*Assistant Examiner*—Edward A. Miller
*Attorney, Agent, or Firm*—Michael Keehan; Hazel L. Deming; S. Grant Stewart

[57] ABSTRACT

The invention provides epoxy cured rubber based propellants containing one or more N,N'-dialkyl- and/or diarylphenylenediamines chemically locked in the polymeric network to impart improved resistance to oxidative hardening of the propellant surface and inner structure.

10 Claims, No Drawings

PROPELLANTS HAVING IMPROVED RESISTANCE TO OXIDATIVE HARDENING

This application is a continuation-in-part of our copending application Ser. No. 667,623, filed Sept. 6, 1967.

This invention relates to solid propellant compositions having improved resistance to oxidative hardening. In one aspect this invention relates to composite rubber based propellants containing one or more N,N'-dialkyl- and/or diarylphenylenediamines chemically locked in the polymeric network as an antioxidant to impart improved resistance to oxidative hardening of the propellant surface and inner structure. Other aspects of the invention will be apparent from the accompanying disclosure and the appended claims.

Solid propellant compositions, as propellants for projectiles, are fast burning oxidizer-fuel systems comprising a solid oxidizer, and a binder system to support the propellant ingredients uniformly throughout the propellant mass and to also serve as a fuel. Upon incorporation of all ingredients into the final propellant mixture, it (the propellant mixture) is maintained under time and temperature curing conditions to form the finished propellant product. Composite type propellants are rubber based and contain narural rubber, or synthetic rubbery polymers or copolymers as the binder component. The binder, or binder system, as it may be referred to, comprises not only the rubbery base material but also all associated ingredients to enable it to function in that capacity such as a suitable plasticizer, curing agent, catalyst for curing when needed, setting agent, antioxidant, and the like. In some instances suitable filler materials are utilized, i.e. reinforcing agents as, for example, carbon black, clays, silica, burning rate catalysts, and the like. These materials along with the oxidizer component of the propellant are dispersed evenly throughout the rubbery binder component and upon curing the mixture all ingredients are evenly dispersed throughout the gel network. Curing is generally carried out after the final ingredient mixture has been emplaced in a suitable mold so that upon completion of the curing reaction the propellant is in the desired shape for use.

In our copending application for U.S. Pat., Ser. No. 667,623, filed Sept. 6, 1967, we have disclosed and claimed composite, i.e. rubber based, propellants in which the binder is formed from a carboxy terminated rubber and an epoxide curing agent. The binder is formed by reacting the carboxy terminated rubber with a curing agent consisting of a mixture of difunctional epoxides and trifunctional epoxides wherein the mole ratio of the dioxide to trioxide introduced into the formulation is in the range of 15:1 to 1:1. The reaction is carried out in the presence of a curing catalyst of the group of chromium salts of an aliphatic carboxylic acid containing from 2 to 22 carbon atoms, chromium naphthenate, and vanadium naphthenate, the ratio of epoxy groups to carboxyl groups in the binder forming mixture being substantially in stoichiometric proportions.

The propellant composition disclosed in our above referred to copending application contains supplemental propellant ingredients commonly employed in the art in making composite propellants such as oxidation inhibitors, reinforcing agents, setting agents, surfactants, ballistic modifiers, burning rate modifiers, metal fuels, and plasticizers. The carboxy terminated rubber, per se, contains an antioxidant added during its recovery from the reaction mixture in which it is formed, and, by its presence in the finished propellant, imparts an oxidation inhibiting action to the propellant. In some instances an additional portion of the same, or other well known, antioxidant is added to the propellant mixture during the blending procedure to impart further antioxidant action to the finished propellant.

We have discovered that aging characteristics of rubber based propellants in which the binder material comprises an epoxide cured carboxy terminated rubber, such as described in our above said copending application, can be markedly improved by the presence of certain antioxidant components which are chemically locked in the polymeric network of the propellant.

In accordance with the invention, a solid rubber based propellant is provided in which the binder is a blend of a carboxy terminated rubber and an N,N' substituted phenylenediamine, cured together with an epoxide curing agent, said phenylenediamine being selected from the group consisting of N,N'-alkylphenylenediamines containing at least four carbon atoms in each alkyl group and N,N'arylphenylenediamines. The phenylenediamine component of the propellant compositions of the invention is reacted with the epoxide curing agent and is thereby chemically "locked" in the polymeric gel and it functions to inhibit oxidative hardening of the propellant surfaces and inner structure at high temperatures over long periods of time. The effectiveness of the phenylenediamine component is unexpectedly retained even though it has reacted with the epoxy curing agent.

In preferred practice the rubber based propellants of the invention contain on a weight basis from about 60 to 90 percent solid oxidizer and from 5 to 20 percent binder. The binder component, based on parts per 100 parts per weight of the carboxy terminated rubber generally contains from 0.1 to 3, and preferably from 0.5 to 1.5, parts of the phenylenediamine antioxidant together with any plasticizer therefor and any additional antioxidant as result of its presence in the polymerization system from which the carboxy terminated rubber per se was recovered. Preferably, the propellant compositions contain about 70 to about 90 weight percent solid oxidizer, about 5 to about 10 percent metal fuel, and from about 5 to about 20 weight percent binder. The binder includes the carboxy terminated rubber, the epoxide mixture and the catalyst, as well as any plasticizer, if present. From about 40 to about 95 weight percent of the binder in the preferred formulation is the carboxy terminated rubber, and from about 1 to about 10 weight percent is the epoxide mixture, while the plasticizer can be from 0 to about 50 weight percent, and preferably from about 20 to 40 percent by weight of the binder.

The finished propellant of the invention in most embodiments contains one or more additional materials such as a metal fuel and ingredients commonly employed in making composite propellants such as reinforcing agents, wetting agents, surfactants, ballistic modifiers, radar attenuators, burning rate modifiers and the like. The propellant is prepared by intimately blending or mixing the ingredients using conventional techniques and standard equipment well known to those skilled in the art as suitable for the purpose. If desired, the addition of the catalyst to the mixture can be delayed until just prior to curing. The latter method offers the distinct advantage of giving a stable mixture which can be stored indefinitely up until the time it is needed.

The curing of the composition is conducted in the presence of the catalyst at any temperature, usually 0° to 100°C., the only effect of temperature variation being to increase or decrease the rate of reaction. It is preferred to carry out the cure at temperatures in the range of about 50° to 80°C.

The epoxide curing agent in preferred practice is a mixture of difunctional epoxides and trifunctional epoxides and the curing reaction is carried out in the presence of a curing catalyst, both also disclosed in the above said application.

The carboxy terminated rubber component of the binder, in preferred practice, is an elastomeric polymer containing on the average about 2 free carboxyl groups per polymer molecule and is preferably a homopolymer of an olefin such as isobutylene or a conjugated diene containing 4 to 8 carbon atoms, such as butadiene-1,3, isoprene, octadiene-1,3, and the like, a copolymer of more than 1 olefin or conjugated diene, such as an ethylene-propylene copolymer, a copolymer of a conjugated diene with other copolymerizable monomers which are preferably vinyl-substituted aromatic compounds such as styrene, the 1- or 2-vinyl naphthalenes and their alkyl, aryl, alkoxy, cycloalkyl, alkaryl, aralkyl, aryloxy, and dialkyl amino derivatives, or a mixture of any of the above homopolymers or copolymers.

The carboxy terminated rubbers can be produced in known manner from the above monomers, as, for example, by carrying out the polymerization in the presence of, as initiators, organoalkali metal compounds of the formula $RM_2$, where R is an aliphatic, cycloaliphatic, or aromatic hydrocarbon radical, M is an alkali metal such as sodium, potassium, lithium, cesium, or rubidium, and n is 2 to 4, and then replacing the alkali metal atoms on the ends of the polymer molecule with COOH groups by reacting with carbon dioxide and then hydrolyzing. Polymers containing 2 or more carboxyl groups per polymer molecule can be prepared by polymerizing an unsaturated carboxylic acid containing a single carbon to carbon double bond, such as acrylic, methacrylic, itaconic, vinyl acetic, oleic, fumaric, maleic, and like acids with itself or with a different copolymerizable monomer such as for example a different unsaturated acid, an olefin or a conjugated diene, according to any of the known methods.

The carboxy terminated rubbers which are particularly useful in practice of this invention are the carboxy-terminated polymers of butadiene and isobutylene, and have molecular weights ranging from about 1,000 to about 20,000, and preferably from about 1500 to about 10,000.

The binder system of the invention is, in preferred practice, the polymeric binder formed by curing, in the presence of certain metal salts, which are catalysts for the carboxyl-epoxide reaction, the carboxy terminated rubber with an all-epoxide curing agent which is a mixture of diepoxides and triepoxides having a diepoxide:- triepoxide mole ratio of from about 15:1 to 1:1, and preferably from 3:1 to 1:1. Maintenance of the ratio of the difunctional epoxides to the trifunctional epoxides within the above ranges is important to the production of propellants having a satisfactory mechanical property balance since below the ratio of 1:1 the propellant elongation is low, and above the ratio of 15:1 the propellant tensile strength is low.

The diepoxides of the mixture contain two epoxide groups per molecule and are the saturated or unsaturated aliphatic, cycloaliphatic, aromatic or heterocyclic diepoxides which also contain, if desired, non-interfering substituents. Preferred diepoxides are the aliphatic diepoxides containing 4 to 30 carbon atoms, the cycloaliphatic diepoxides containing 12 to 40 carbon atoms and the diglycidyl ethers of dihydric phenols. Typical diepoxides include butadiene dioxide; 1,2,5,6-diepoxyhexane; diglycidyl ether; diglycidyl ether of 1,3-butanediol; 1,8-bis(2,3-epoxypropoxy) octane; 1,4-bis(2,3-epoxypropoxy) cyclohexane; 1,4-bis(3,4-epoxybutoxy)-2-chlorocyclohexane; the di(epoxycyclohexanecarboxylates) of aliphatic diols exemplified by the bis(3,4-epoxycyclohexanecarboxylate) of 1,5-pentanediol, 3-methyl-1,5-pentanediol, 2-methoxymethyl-2,4-dimethyl-1,5-pentanediol, ethylene glycol, 2,2-diethyl-1,3-propanediol, 1,6-hexanediol and 2-butene-1,4-diol; the oxyalkylene glycol epoxycyclohexanecarboxylates exemplified by bis(2-ethylhexyl-4,5-epoxycyclohexane-1,2-dicarboxylate) of dipropylene glycol, bis(3,4-epoxy-6-methylcyclohexanecarboxylate) of diethylene glycol and bis (3,4-epoxycyclohexanecarboxylate) of triethylene glycol; the epoxycyclohexylalkyl epoxycyclohexanecarboxylates exemplified by 3,4-epoxycyclohexylmethyl 3,4-epoxycyclohexanecarboxylate, 3,4-epoxy-1-methylcyclohexylmethyl 3,4-epoxy-1-methyl-cyclohexanecarboxylate, 3,4-epoxy-2-methylcyclohexylmethyl 3,4-epoxy-2-methyl-cyclohexanecarboxylate, 3,4-epoxy-6-methylcyclohexylmethyl 3,4-epoxy-6-methylcyclohexane-carboxylate, (1-chloro-3,4-epoxycyclohexan-1-yl) methyl 1-chloro-3,4-epoxycyclohexanecarboxylate, (1-bromo-3,4-epoxycyclohexan-1-yl) methyl 1-bromo-3,4-epoxycyclohexanecarboxylate and (1-chloro-2-methyl-4,5-epoxycyclohexan-1-yl) methyl 1-chloro-2-methyl-4,5-epoxycyclohexanecarboxylate; epoxycyclohexylalkyl dicarboxylates exemplified by bis(3,4-epoxycyclohexylmethyl) pimelate and oxalate and bis(3,4-epoxy-6-methylcyclohexylmethyl) maleate, succinate, sebacate and adipate; epoxycyclohexylalkyl phenylene-dicarboxylates exemplified by bis(3,4-epoxycyclohexylmethyl) terephthalate; bis(3,4-epoxy-6-methylcyclohexylmethyl) diethylene glycol ether, vinyl cyclohexene dioxide; diepoxide of dicyclohexene; dicyclopentadiene dioxide; bis(2,3-epoxycyclopentyl) ether; glycidyl 2,3-epoxycyclopentyl ether; 2,3-epoxycyclopentyl 2-methylglycidyl ether; 1,2,5,6-diepoxy-3-hexyne; 1,3-bis(2,3-epoxypropoxy) benzene; 1,4-bis(2,3-epoxypropoxy) benzene; 1,3-bis(4,5-epoxypentoxy)-5-chlorobenzene; 4,4'-bis(2,3-epoxypropoxy) diphenylether; 2,2-bis(2,3-epoxypropoxyphenyl) methane; 2,2-bis[p-(2,3-epoxypropoxy) phenyl] propane, i.e., the diglycidyl ether of bisphenol A; quinoline diepoxide and the like, as well as mixtures thereof.

The triepoxides of the mixture contain three epoxide groups per molecule and are aliphatic, cycloaliphatic or aromatic triepoxides. Preferred triepoxides are the triepoxyalkanes containing 6 to 25 carbon atoms; the tri(epoxycyclohexane carboxylates) and the triglycidylethers of trihydric alcohols such as glycerol, 1,1,1-tri(hydroxymethyl) propane, 1,2,6-hexanetriol and the higher alcohols containing up to about 25 carbon atoms; and the triglycidyl ethers of trihydric phenols, such as phloroglucinol, the trihydroxydiphenyl methanes and propanes, the trihydroxyaminophenols, the trisphenols; and the like as well as mixtures thereof. Typical triepoxides include triepoxyhexane; triepoxydecane; 2,3,6,7,11,12-triepoxydodecane; 2,3,5,6-diepoxy-9-epoxyethyldodecane; tris(3,4-epoxycyclohexanecarboxylate) of 1,1,1-trimethylol propane; tris(3,4-epoxycyclohexanecarboxylate) of 1,2,3-propanetriol; 2,2[2,4,4'-tris(epoxypropoxy) diphenyl] propane; 1,1-bis(glycidyloxymethyl)-3,4-epoxycyclohexane; N,N,O-tris(epoxypropyl) p-aminophenol; and the like. Epoxide mixtures containing the diglycidylethers of bisphenol A and the triepoxides of the aminophenols are particularly preferred.

For best results, both the diepoxide and the triepoxide of the mixture will be in the relatively pure state, i.e., having a purity of about 95 to 100 percent in order that all of the available carboxy groups of the rubber will be incorporated into the gel network without wastage of any appreciable number of polymer chains as dangling ends which do not contribute to the gel network.

The ratio of the epoxy groups in the epoxide mixture to the carboxyl groups of the rubber in the binder should be in substantially stoichiometric proportions. Although a slight excess of either is not harmful, it is preferred that a slight excess of epoxy groups over carboxyl groups be present in the binder, generally at a mole ratio of epoxy groups to carboxy groups within the range of from 0.9:1 to 2:1.

The reaction of the carboxy terminated rubber with the above described epoxide mixture requires the presence of a catalyst which promotes the carboxyl-epoxide reaction. Catalysts of this type must also have high activity in the presence of the other propellant ingredients, and must not adversely affect the desirable properties of the cured propellant, as by side reactions. The catalysts which have been found to fit all of the above requirements are chromium salts of aliphatic carboxylic acids containing 2 to 22 carbon atoms and preferably 2 to 18 carbon atoms, chromium naphthenate or vanadium naphthenate. The preferred catalysts include chromium acetate, chromium 2-ethylhexanoate, chromium neodecanoate, chromium stearate, chromium oleate, chromium naphthenate and vanadium naphthenate. The amount of catalyst necessary to promote the reaction will, of course, depend on many factors, as for example, on the particular salt employed, the binder materials and other propellant ingredients present and the cure rate desired. In general, the amount utilized will vary from a very small catalytic amount up to about 0.1 percent of the propellant composition and preferably will be from about 0.005 percent to about 0.03 percent by weight of the composition.

The solid oxidizer component of the propellants of the invention is preferably an inorganic oxidizing salt, a number of which are well known to the art. Typical of such inorganic salts are the ammonium, alkali metal, or alkaline earth metal salts of nitric, perchloric, or chloric acids or mixtures thereof, and particularly such salts as ammonium perchlorate, sodium perchlorate, potassium perchlorate, magnesium perchlorate, lithium chlorate, strontium chlorate, potassium nitrate, sodium nitrate, calcium nitrate, ammonium nitrate, and the like. Other solid oxidizers such as cyclotetramethylene tetranitramine, cyclotrimethylene trinitramine, nitroguanidine, and the like can be substituted for all or part of the inorganic oxidizing salt, if desired. The phenylenediamine antioxidant components are, in preferred practice, N,N'-dialkyl-p-phenylenediamines wherein each alkyl contains at least 4 carbon atoms, generally from 4 to 10 carbon atoms. However, suitable N,N'-dialkylphenylenediamine antioxidants wherein the alkyl contains a number of carbon atoms outisde the above range can be used when desired. A now preferred aryl substituted phenylenediamine is N,N'-diphenyl-p-phenylenediamine. Exemplary phenylenediamine antioxidant components of the invention are the p-phenylenediamines, N,N'-dihexylphenylenediamine, N,N'-diheptylphenylenediamine, N,N'-bis(1-methylheptyl)phenylenediamine, N,N'-di(2-ethylhexyl)phenylenediamine, N,N'-bis(1-ethyl-3-methylpentyl) phenylenediamine, N,N'-bis(1-methylpentyl)-phenylenediamine, N,N'-bis(1-methylbutyl)-phenylenediamine, N,N'-bis(isobutyl)phenylenediamine and N,N'-bis(n-butyl)phenylenediamine.

The propellants of the invention are prepared in any suitable manner by intermittently blending or mixing the ingredients using conventional techniques and standard equipment known to those skilled in the art for that purpose. If desired, when a curing catalyst is utilized, the catalyst addition to the ingredient mixture can be delayed until just prior to cure to afford the advantage of a stable mixture which can be store indefinitely up until the time that it is needed. pgs.80

The epoxide-carboxy terminated rubber curing reaction is generally conducted in the presence of a suitable curing catalyst inasmuch as the curing time, in absence of a curing catalyst, is in most instances unduly long. The curing reaction temperature is usually from 25° to 100°C., the rate of the curing reaction increasing with temperature. It is generally preferred, however, to carry out the cure at temperatures in the range of about 50° to 80°C. under which conditions the reaction rate is sufficiently high from the economics standpoint but sufficiently low as to preclude appreciable side reactions or to produce appreciable shrinkage and internal stress.

The invention is illustrated with reference to the following examples, all parts and percentages set forth therein being on a weight basis.

EXAMPLES 1–4

Four propellant compositions of the invention were prepared as summarized in Table I.

The uncured binder system, basic to each propellant composition was prepared by forming four separate solutions each of about 0.09 part of a chromium 2-ethylhexanoate, having a chromium content of 10.9 percent, in 64.40 parts of a carboxy terminated polybutadiene having a molecular weight of about 5000, a specific gravity of about 0.90 at 60/60°F., a viscosity of 282 poises at 77°F., and a carboxyl content of about 0.0338 equivalents per 100 parts of polybutadiene; the carboxylated polybutadiene containing 1.29 weight percent of 2,2'-methylene-bis(4-methyl-6-tertiary-butylphenol) added as an antioxidant during its recovery from the reaction mixture in which it was formed, i.e. prior to its utilization as a binder component. To each of three of the four solutions thus prepared, 1.0 part of additional antioxidant was added as shown in Table I with reference to Examples 2, 3 and 4.

The epoxide curing agent, for reaction with the carboxy terminated polybutadiene, was then added with stirring together with 16 parts by weight of dioctyl adipate and 14.44 to 15.91 parts of a polybutadiene as plasticizers for the binder. The epoxide curing agent in each binder solution was composed of 3.60 to 4.07 parts by weight of a mixture of DER-332 (the condensation product of bisphenol A and epichlorohydrin)

and ERL-0510 (N,N,O-tris(epoxypropyl)p-aminophenol) whose composition is described in Table I.

The four propellant formulations were each prepared in a Baker Perkins vertical mixer (driven by an air motor and heated to 65°C. by water) by mixing the particular binder solution (or a portion thereof) in a 12 percent proportion, in the order given with 5 percent powdered aluminum (average particle size of 10 microns), micro atomized ammonium perchlorate (average particle size, 10 microns), unground ammonium perchlorate (average particle size, 200 microns) and spherical ammonium perchlorate (average particle size, 400 microns), in proportions of about 31:32:20 to produce a total of 83 percent trimodal ammonium perchlorate.

After a total mixing period of 45 minutes, the resulting slurry was in each of four instances transferred to a wax-coated cardboard container, the inside length, width and height dimensions of which were 4 inches × 1.25 inches × 7 inches, respectively, and therein deaerated in a vacuum desiccator at about 80°C. to a pressure of 1 mm. for 30 minutes followed by curing in a forced air oven at 80°C. Mechanical properties of the cured propellants before, and after, aging, were evaluated by machining "dumbbell" shaped test strips therefrom (1.9 inches effective gauge length × ⅜ inch width × ¼ inch thick × ½ inch radius) following by drying over silica gel for 3 days, and then age testing the specimens at 205°F. for a period of two weeks. The data further pertinent to these tests are summarized as follows (Table I) with reference to Examples 1–4.

Thus, in each of the tests of Table I the "dumbbell" strip specimens were measured for modulus and elongation at maximum stress either before or after the aging period, i.e. at 205°F. A strain retention of only 19.8 percent, calculated on basis of elongation at maximum stress, before and after aging, was obtained for specimens of Example 1 in which the only antioxidant was 2,2-methylene-bis(4-methyl-6-tertiary-butylphenol) inherently present as result of its function as an antioxidant during recovery of the carboxy terminated butadiene during its preparation. As shown with reference to Example 2, by more than doubling the amount of the inherently present antioxidant of Example 1, i.e. to provide a total of 1.9 percent of the antioxidant in the binder system of the propellant, the strain retention was only 34.2 percent. As demonstrated with reference to Example 3, the addition of 1.0 percent N,N'-bis(1,4-dimethylpentyl)p-phenylenediamine in lieu of the added portion of antioxidant of Example 2, provided a markedly improved strain retention, namely 78.4 percent which demonstrates the action of phenylenediamine antioxidants in practice of the invention. Example 4 similarly demonstrates a strain retention of 48.3 when N,N'-diphenyl-p-phenylenediamine was utilized in lieu of the added portion of antioxidant of Example 2 again demonstrating the antioxidant action of phenylenediamine antioxidants in accordance with the invention.

As shown in Examples 3 and 4, additional epoxide is added as curing agent, when phenylenediamines are added in accordance with the invention, which is nec-

TABLE I

| | | | | Cured Propellant Mechanical Properties[3] | | | | |
|---|---|---|---|---|---|---|---|---|
| | Mole Ratios | | Antioxidant, | Before Test | | After Test | | Strain |
| Example No. | Epoxide/ Carboxyl | Di-/Tri- Epoxide | (Weight percent of Binders) | Modulus (psi) | Elongation at Maximum Stress (percent) | Modulus (psi) | Elongation at Maximum Stress (percent) | Retention (percent) |
| 1 | 1.00 | 6.5 | 2,2'-methylene-bis(4-methyl-6-tert.-butyl-phenol) (0.9) | 435 | 35.5 | 1920 | 7 | 19.8 |
| 2 | 1.05 | 6.5 | 2,2-methylene-bis(4-methyl-6-tert.-butyl-phenol) (1.9) | 370 | 39.5 | 1140 | 13.5 | 34.2 |
| 3 | 1.27[1] | 3.28 | 2,2'-methylene-bis(4-methyl-6-tert.-butyl-phenol) (0.9); N,N'-bis(1,4-dimethylpentyl) p-phenylene-diamine (1.0) | 805 | 25.5 | 860 | 20 | 78.4 |
| 4 | 1.27[2] | 3.28 | 2,2-methylene-bis(4-methyl-6-tert.-butyl-phenol) (0.9); N,N'-diphenyl-p-phenylene-diamine (1.0) | 750 | 28 | 1420 | 13.5 | 48.3 |

[1]Same as for Run No. 2 (1.05) except that additional epoxide added to compensate for loss due to reaction of the epoxide curing agent with N,N'-bis(1,4-dimethylpentyl)p-phenylenediamine.
[2]Same as for Run No. 2 (1.05) except that additional epoxide added to compensate for loss due to reaction of the epoxide curing agent with N,N'-diphenyl-p-phenylenediamine.
[3]Measurements made at 77°F. at 0.74 inch/inch/minute strain rate.

The tests of Examples 1–4, summarized in Table I demonstrate that resistance of the propellant surfaces to thermal oxidative hardening is markedly improved by the presence of N,N'-bis(1,4'-dimethylpentyl)p-phenylenediamine and N,N'-diphenyl-p-phenylenediamine in tests Nos. 3 and 4 Table I, as antioxidants in accordance with the invention.

essary to compensate for that portion of total epoxide which reacts with those secondary amines. In the event that a compensating proportion of the epoxide curing agent is not added to the system, the resulting get network of the binder system is often unduly soft to be utilizable in bonded motors.

It is a feature of this invention that not only are the defined phenylenediamines chemically reacted with the epoxide curing agent so as to be chemically "locked" in the binder system, but the so reacted phenylenediamines still impart improved resistance to thermal oxidative hardening of propellant surfaces and hence exists under low volatility conditions to function at higher temperatures for longer periods of time than would be the case if they were merely physically held in the gel network.

EXAMPLES 5 and 6

A portion of the carboxy terminated polybutadiene of Examples 1–4, containing 1.29 weight percent of the phenol antioxidant, i.e. 2,2-methylene-bis(4-methyl-6-tertiary-butylphenol), incorporated therein during recovery of the carboxy terminated polybutadiene during its preparation, together with 3.2 percent of N,N'-O-tris(epoxypropyl)p-aminophenol as an epoxy curing agent in an epoxide/carboxyl mole ratio of 1.01, and 0.1 percent of chromium octoate as a curing catalyst, was drawn into a 0.3 inch, i.d. glass tube and maintained at 80°C. for 7 days to effect curing. The resulting cured rubber was Soxhlet extracted with acetone for 6 days and then dried, and the resulting extracted rubber was subjected to aging at 205°F. and tested for modulus at intervals during that period. The results of the tests are summarized in Table II (Example 5).

Another cured rubber, similar to that in Example 5 and prepared in accordance with the procedure of Example 5, except that the added antioxidant (1.5 percent) was N,N'-bis(1,4-dimethylpentyl)p-phenylenediamine, i.e., in lieu of the added 2,2'-methylene-bis(4-methyl-6-tertiary-butyl)phenol and that the epoxide to carboxyl ratio was 1.23, was Soxhlet extracted with acetone, as in Example 5, and the resulting extracted cured rubber was subjected to aging at 205°F., and tested for modulus at intervals during that period. The results of the tests are summarized in Table II (Example 6).

TABLE II

| Example No. | Modulus[1] (psi) After Aging | |
|---|---|---|
| | 5[3] | 6[3] |
| Antioxidant | 2,2-methylene-bis(4-methyl-6-tertiary-butyl-phenol) | N,N'-bis (1,4-dimethylpentyl) p-phenylene-diamine |
| Time (days) aged at 205°C. | | |
| 0 | 18.6 | 19.4 |
| 15[2] | 9.3 | 13.0 |
| 23 | 12.3 | 13.7 |
| 30 | 12.5 | 12.1 |
| 45 | 28.1 | 16.1 |
| 56 | glass like | 17.1 |
| 73 | — | 17.9 |
| 99 | — | 20.3 |
| 113 | — | 22.6 |
| 151 | — | 31.2 |
| 178 | — | 33.7 |
| 221 | — | 48.3 |
| 255 | — | glass like |

[1]Modulus is secant modulus at 10 percent strain.
[2]First 15 days in cork stoppered glass vial in oven; thereafter in open container in stagnant air oven.
[3]Rubbers were extracted with acetone prior to aging.

The tests summarized in Table II demonstrate the locked-in nature of the antioxidant in practice of the invention. Thus, Example 6 demonstrates that when the added antioxidant is N,N'-bis(1,4-dimethylpentyl)-p-phenylenediamine, the modulus has changed very little after a period of 15 days aging, in a cork stoppered glass vial, plus 163 additional days in an open container in the stagnant air oven; whereas under the same conditions the control containing a phenolic antioxidant (Example 5) was "glass like" in only 56 days due to the relatively poor protection of the phenolic antioxidant. If the antioxidants had not been "locked in" the binder, the acetone extraction would have removed all of the antioxidant and the rubbers would have oxidized to a glass in much less than 60 days at 205°F. in an open container in a stagnant air oven.

As will be evident to those skilled in the art, various modifications can be made or followed, in the light of the foregoing disclosure and discussion, without departing from the spirit or scope of the disclosure or from the scope of the claims.

What we claim and desire to protect by Letters Patent:

1. A solid propellant composition comprising a solid oxidizer and a polymeric binder formed by curing an uncured carboxy terminated rubber containing an average of about 2 free carboxyl groups per polymer molecule with, as curing agent, a mixture of difunctional epoxides and trifunctional epoxides wherein the diepoxide:triepoxide mole ratio in said mixture is 15:1 to 1:1 and the ratio of epoxy groups in said mixture to carboxy groups in said rubber being within the range of from 0.9:1 to 2:1, in the presence of a phenylenediamine antioxidant selected from the group consisting of N,N'-dialkylphenylenediamines containing at least 4 carbon atoms in each alkyl group and N,N'-diarylphenylenediamines, said phenylenediamine being chemically locked in the binder network during cure.

2. The composition of claim 1 containing from 5 to 20 weight percent of said binder.

3. The composition of claim 2 wherein the carboxy terminated rubber is a polymer selected from the group consisting of a carboxy terminated polybutadiene and carboxy terminated polyisobutylene having a molecular weight within the range of from about 1000 to about 20,000.

4. The composition of claim 2 wherein said binder, based on 100 parts by weight of the carboxy terminated rubber, contains from 0.1 to 3 parts by weight of said phenylenediamine.

5. The composition of claim 2 containing from about 60 to about 90 weight percent of the solid oxidizer.

6. The composition of claim 2 wherein said phenylenediamine is N,N'-bis(1,4-dimethylpentyl)-p-phenylenediamine.

7. The composition of claim 2 wherein said phenylenediamine is N,N'-diphenyl-p-phenylenediamine.

8. The composition of claim 5 wherein said solid oxidizer is ammonium perchlorate.

9. The composition of claim 8 containing from 70 to 90 weight percent of said ammonium perchlorate and from 5 to about 10 weight percent of a metal fuel.

10. The composition of claim 9 wherein said binder contains from about 40 to 95 weight percent of said carboxy terminated rubber, and from about 1 to 10 weight percent of said mixture of epoxides.

* * * * *